United States Patent

[11] 3,577,092

[72] Inventor Arthur P. Kubicz
Richardson, Tex.
[21] Appl. No. 743,525
[22] Filed July 9, 1968
[45] Patented May 4, 1971
[73] Assignee Collins Radio Company
Cedar Rapids, Iowa

[54] SIGNAL PATH SERIES STEP-BIASED MULTIDEVICE HIGH-EFFICIENCY AMPLIFIER

7 Claims, 10 Drawing Figs.

[52] U.S. Cl. 330/124, 307/296, 325/185, 330/40, 330/200
[51] Int. Cl. H03f 3/20, H03f 3/68
[50] Field of Search 332/31, 31 (T), 48, 56; 307/296; 330/40, 124, 199, 200; 325/187, 182, 185

[56] References Cited

UNITED STATES PATENTS

| | | | |
|---|---|---|---|
| 2,404,099 | 7/1946 | Schade | 330/124X |
| 2,602,919 | 7/1952 | Drazy | 332/48 |
| 2,692,371 | 10/1954 | Balch | 332/48X |
| 3,293,530 | 12/1966 | Baude | 307/296X |
| 3,335,370 | 8/1967 | Wittig et al. | 325/181X |
| 3,443,239 | 5/1969 | Schmitt | 332/31X |

*Primary Examiner*—Alfred L. Brody
*Attorneys*—Warren H. Kintzinger and Robert J. Crawford

ABSTRACT: A high-efficiency transformerless amplitude modulation system with an audio frequency power amplifier having at least two amplifier segments with at least one amplifier device in each, a different level voltage power supply for each amplifier segment, and a bias step between adjacent amplifier segments, and with a modulation output direct DC connection from the AFPA to the RF power amplifier of the system.

Figure 1:
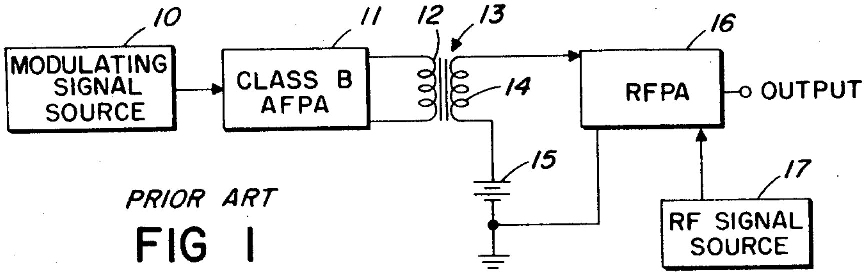
PRIOR ART FIG 1

INVENTOR.
ARTHUR P. KUBICZ
BY
Warren H. Kintzinger
ATTORNEY

INVENTOR.
ARTHUR P. KUBICZ
BY Warren H. Kintzinger
ATTORNEY

SIGNAL PATH SERIES STEP-BIASED MULTIDEVICE HIGH-EFFICIENCY AMPLIFIER

The invention described herein was made in the performance of work under a NASA contract and is subject to the provisions of Section 305 of the National Aeronautics and Space Act of 1958, Public Law 85-568 (72 state 435; 42 U.S.C. 2457).

This invention relates in general to high-level amplitude modulation (AM) of radio frequency power amplifiers (RFPA) generally used when AM is desired since it permits high efficiency, good modulation linearity, noncritical adjustment, and high output power for a given RF amplifying device, and in particular, to a high efficiency transformerless amplitude modulator directly coupled to a radio frequency power amplifier.

The most generally used prior art system for high level AM modulation to a radio frequency power amplifier utilizes a balanced class B amplifier transformer coupled to the RFPA with transformer or transformer-choke coupling included in order to convert from the balanced output of the AFPA to the required unbalanced input to the RFPA. Such transformer coupling also serves to isolate the AFPA and RFPA power supplies, one from the other. There are limitations, however, with this approach primarily attributable to the transformer coupling such as, a difficulty in obtaining uniform and wide frequency response, and with DC and very low-frequency response characteristically unobtainable. Such transformer or transformer-choke signal coupling combinations are not only large and heavy but also in many complex and expensive, and with these factors further aggravated since such transformers or transformer-choke combinations must carry the large unbalanced direct current supplied to the RFPA. The situation becomes even worse particularly if extended frequency response is required. Transformer inefficiency cuts into overall modulating system efficiency, and stability of the RFPA is many times subject to undesired impairment through reactance and/or resonances of the transformer coupling. Further, transient overshoots due to transformer inductance sometime destroy AFPA or RFPA components, especially transistors, unless additional protective components are used. Reverse currents during overmodulation also contribute to component destruction since they are readily fed to the RFPA where they may destroy semiconductors unless appropriate protective components are employed. Problems are further compounded with an AM system using transformer or transformer-choke coupling when transistors, with their low operating voltages, are used in a higher power RFPA since the modulating input impedance is extremely small, and a complex low output impedance power supply is required for the RFPA.

Another prior art AM system utilizes a class A series modulator direct output connected to an RF power amplifier in eliminating the requirement for a signal-coupling transformer and thereby eliminates many disadvantages set forth above with transformer or transformer choke signal-coupling employed with class B amplification transformer coupled to the RFPA. This second alternate prior art approach, however, does have a very serious alternate disadvantage in that its performance is at very low efficiency at zero and low modulation levels, actually areas in voice communication where efficiency is important since this is a normal generally encountered condition in voice communication.

It is, therefore, a principal object of this invention to provide a high efficiency transformerless amplitude modulator system with a mode of operation that may be considered as quasi Class B operation with substantially all the advantages, and some more than, obtained with an AFPA balanced class B amplifier transformer coupled to an unbalanced input RFPA amplitude modulation system, and without the multitudinous disadvantages encountered with such transformer coupled AM modulation systems.

Another object is to provide such a direct coupled AM modulator system that is inherently capable of very high efficiency even at zero and low modulation levels.

A further object is to provide such an AM modulation system of relatively simple construction with a reduction in component requirements, a reduction in expense, and a great simultaneous increase in reliability throughout greatly extended service life.

Features of this invention useful in accomplishing the above objects include, in a high efficiency transformerless amplitude modulator system an audio frequency power amplifier circuit connected for receiving a modulating input signal and having at least two amplifier segments with at least one amplifier device in each, a different level voltage power supply connection for each amplifier segment, and with a bias source step between adjacent amplifier segments. There is a modulation signal output connection, without transformer or transformer-choke signal coupling, as a modulating signal input to an RFPA which, in most embodiments, is a direct connection from the AFPA to the RFPA.

Specific embodiments representing what are presently regarded as the best modes of carrying out the invention are illustrated in the accompanying drawings.

Figure 2:
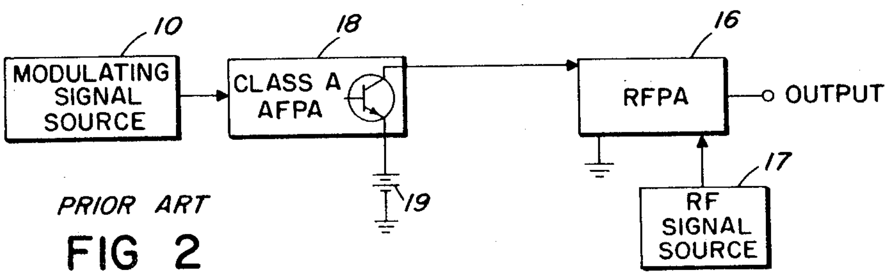
PRIOR ART FIG 2
Figure 3:
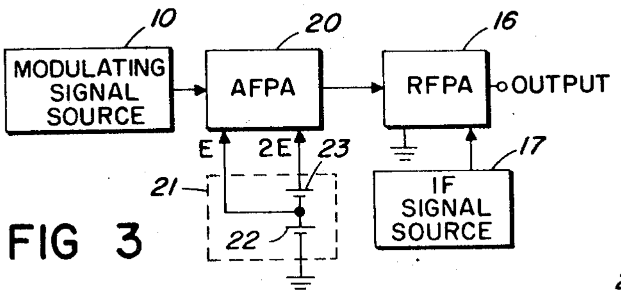
Figure 4A:
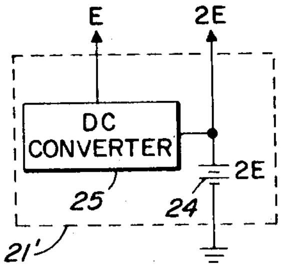
Figure 5:
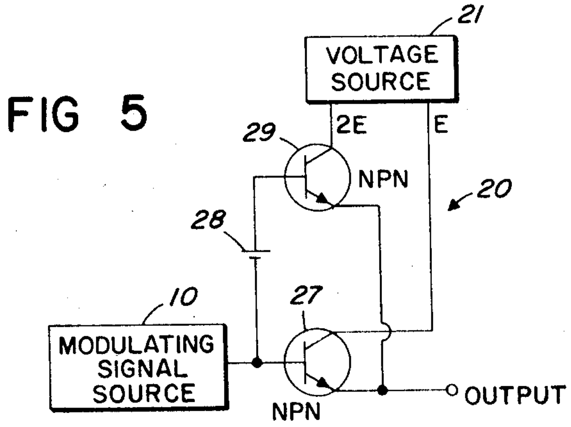
Figure 4B:
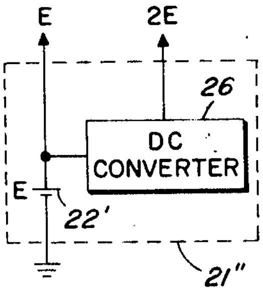
Figures 6, 7:
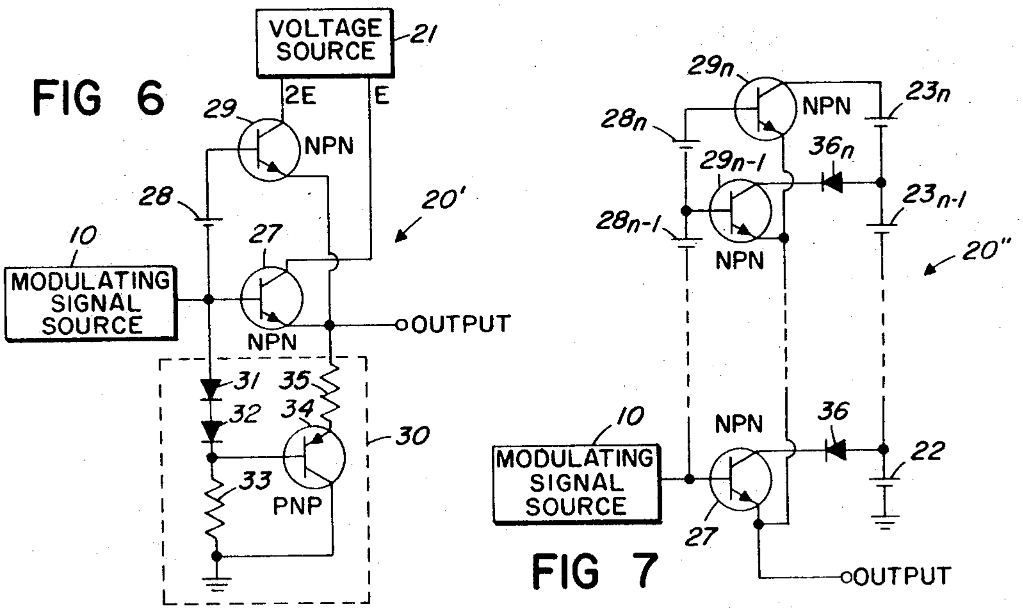
Figure 8:
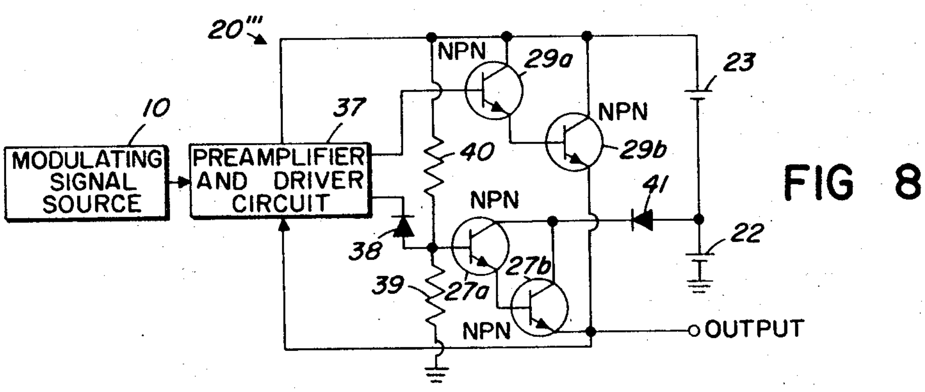
Figure 9:
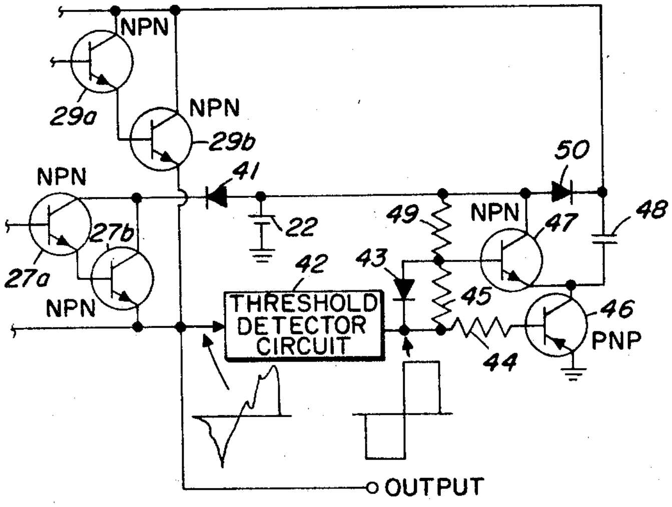

In the drawings:

FIG. 1 represents a block schematic diagram of a prior art audio frequency balanced class B amplifier transformer coupled to an RF power amplifier;

FIG. 2, another prior art block schematic showing of a class A series modulator direct output connected to an RF power amplifier without a transformer;

FIG. 3, a simple block diagram showing of a new high efficiency audio frequency power amplifier with two different voltage level connections and having a direct transformerless output connection as an input to an RF power amplifier;

FIGS. 4*a* and 4*b*, alternate methods for providing two voltage levels applied to the audio frequency power amplifier of FIG. 3 from a single voltage supply;

FIG. 5, a schematic of applicant's improved audio frequency power amplifier developing an output that may be directly coupled to an RF power amplifier as indicated in FIG. 3;

FIG. 6, a schematic of another audio frequency power amplifier similar in many respects to the embodiment of FIG. 5 with, however, further refinements directed toward considerably improved performance at high frequencies and/or in spite of reactive loads;

FIG. 7, a schematic showing of another audio frequency power amplifier similar in some respects to the embodiments of FIGS. 5 and 6 with, however, more than two amplifier segments and with at least one amplifying device and an individual power supply for each amplifier segment and with a bias source step between adjacent amplifier segments;

FIG. 8, a high performance, higher power audio frequency power amplifier embodiment operating from a preamplifier and driver circuit with two amplifying devices in each of two segments of the AF power amplifier and employing negative feedback from both segments of the power amplifier to the preamplifier and driver circuit; and FIG. 9, a partial schematic showing how a voltage doubler could be used in an audio frequency power amplifier in place of one of the voltage supplies in the embodiment of FIG. 8.

Referring to the drawings:

In the prior art amplitude modulating system of FIG. 1 a modulating signal source 10 has an output signal connection as an input to a class B audio frequency power amplifier 11 developing a two-line balanced signal output to opposite ends of the primary coil 12 of a signal coupling transformer 13 having a secondary coil 14. One end of transformer secondary coil 14 is connected to the positive terminal of a voltage supply 15, in the form of a battery having its negative terminal connected to ground, in order that the other end of secondary coil 14 may be connected as an unbalanced input to radio frequency power amplifier 16. The RFPA 16 also receives an RF signal input from RF signal source 17 in order that an audio-modulated RF carrier signal output may be developed.

In the prior art AM modulating system of FIG. 2 modulating signal source 10 has a direct signal output connection as a modulating signal input connection to a class A, AFPA 18. This class A, AFPA 18 has a connection to the positive terminal of a voltage supply in the form of a battery 19, the negative terminal of which is connected to ground in order that amplifier 18 may develop an unbalanced output directly connected as an unbalanced modulating signal input to RFPA 16. The RFPA 16 also receives an RF signal input from RF signal source 17 in order to develop an RF carrier-modulated signal output. Please note that components and sections in various embodiments and any of the prior art systems that are the same or substantially the same will generally carry the same numbers as a matter of convenience.

In operation of the prior art modulating system of FIG. 2 please consider the AFPA 18, essentially a Class A amplifier, as a linear electronic variable resistor in series between the power supply battery 19 and the RFPA 16. It is of interest to note that the power supply voltage from battery 19 must be twice that used for the transformer 13 coupled AM modulator of FIG. 1 to provide 100 percent positive modulation with the same RF carrier output power. At the zero modulation level and in the immediate area of substantially zero modulation level, the voltage across the AFPA element in the AM modulation system of FIG. 2 is at least equal to the voltage supplied to the RFPA 16. Further, since the current through both the AFPA 18 and RFPA 16 is the same, the power dissipated by the AFPA 18 is at least equal to the RFPA 16 input power resulting in a prohibitively large loss particularly in higher power transmitters.

Referring now to the AM modulating system of FIG. 3, applicant's new high efficiency audio frequency power amplifier 20 is shown to have two voltage connections from voltage power supply 21. Power supply 21 is shown to include two batteries 22 and 23, of substantially equal voltage value, series connected with their negative terminals toward ground and their positive terminals toward the 2E value level voltage connection to AFPA 20. A connection from the common junction between the two batteries 22 and 23 forms the E value level voltage connection to the AFPA 20.

In the alternate FIG. 4A voltage power supply system 21′ for developing and E and 2E voltage source connections for use with an AFPA 20, as in the showing of FIG. 3, a single 2E level developing battery 24 with its negative terminal connected to ground has its positive terminal connected as the 2E connection for AFPA 20. The positive terminal is also connected to a DC converter 25 for conversion from the 2E voltage level to an E voltage level applied as the other voltage input connection for an AFPA 20.

In the FIG. 4B alternate voltage power supply system 21″ a single E value level battery 22′ with its negative terminal connected to ground has its positive terminal connected as the E value level voltage connection to AFPA 20. Its positive terminal is also connected through DC converter 26 for developing a 2E output connected as a 2E value level voltage connection for AFPA 20.

Referring now to FIG. 5 for schematic detail of one embodiment of Applicant's improved audio frequency power amplifier, the modulating signal input is shown to be connected directly to the base of NPN transistor 27 in AFPA 20 and also through battery 28, acting as a bias source step, to the base of NPN transistor 29. The collector of NPN transistor 27 is connected to the E value level voltage connection of voltage power supply 21 and the collector of NPN transistor 29 is connected to the 2E value level voltage connection of the voltage power supply 21. The emitters of NPN transistors 27 and 29 are connected in common as the modulating signal output of the high efficiency audio frequency power amplifier 20.

During operation of an AM modulating system such as shown in FIG. 3 utilizing an improved AFPA as shown in FIG. 5 let us first assume the zero modulation state with a normal RF carrier output. With this condition of operation transistor 27 is near saturation and transistor 29 is held just beyond cutoff by bias source 28 and the voltage bias developed therethrough in a bias step resulting in a higher positive voltage level at the base of NPN transistor 29. This provides that the voltage applied to RFPA 16 through the direct modulation output connection from AFPA 20 is at the E value level less the small voltage drop through transistor 27 for the assumed operational state. Since the voltage drop through transistor 27 is small the power loss is quite small and there is absolutely no simultaneous loss in and through transistor 29 since it is being held in the cutoff state. With an operational change such as encountered with a negative modulation signal excursion being applied to the base of transistor 27 and through battery 28 to the base of NPN transistor 29 it should be noted that with transistor 29 already biased to cut off in the zero modulation state, the negative-going input modulation signal only increases the cutoff bias applied to the transistor 29. However, NPN transistor 27 that had been near saturation for the zero modulation state now behaves substantially as a linear amplifier and when the modulating signal input again approaches the zero-volt level NPN transistor 27 approaches cutoff and again the modulation output approaches zero volts.

With the modulation signal input operationally going to a positive modulation signal voltage value as applied to the base of NPN transistor 27 and through battery 28 to the base of NPN transistor 29 it should be noted with respect to NPN transistor 27 that since it was nearly saturated for the zero modulation state a positive input signal cannot increase the modulation output voltage through and from NPN transistor 27. However, NPN transistor 29, which had been held in the cutoff state via the potential bias step of battery 28, now conducts and behaves as a linear amplifier. When the modulating input signal approaches the 2E value level, transistor 29 approaches saturation and the modulation output is limited to the 2E value level minus the saturation voltage of NPN transistor 29. Please note that positive modulation could be extended to substantially any level simply by increasing the 2E value level voltage. This is a very simple means of incorporating what is known as ultramodulation with modulation of the positive excursions of the output being more than the negative excursions to obtain considerably higher sideband power than possible with normal 100 percent AM. With the new AFPA 20, shown in FIG. 5, since each half of the modulation output voltage is amplifier by a separate device, similar to a class B amplifier, this mode of operation may be considered quasi-class B operation. Please note also that while the active elements shown in the embodiment of FIG. 5 are transistors the concept is substantially identically applicable to vacuum tubes or to other active elements. Another advantageous facet of the circuit is that, if direct coupling is used throughout the modulation preamplifier and the AFPA 20, and direct-coupled feedback is employed, the system acts to regulate the voltage applied from and through the modulation output line to the RFPA to thereby advantageously permit the use of relatively unfiltered power supplies without detrimental results. Please note further, that this circuit may be used as a regulator for a power supply with the power supply, as a result, being a highly regulated high-efficiency power supply that can be modulated at high slew rates with excellent linearity.

A further additive refinement to the circuit of FIG. 5 is the circuit addition illustrated in FIG. 6 and provided for considerably improving performance at high frequencies and/or reactive loads. THis includes a circuit section 30 with two series-connected diodes 31 and 32 connected anode toward the junction of the modulating signal source 10, the base of transistor 27 and battery 28, and with the cathodes toward resistor 33 and through the resistor 33 to ground. The common junction of the cathode of diode 32 and resistor 33 is connected to the base of PNP transistor 34 the emitter of which is connected through resistor 35 to the emitters of NPN transistors 27 and 29 in common with the output line of the AFPA 20′ and the collector of the PNP transistor 34 is connected to ground. This circuit 30 addition in the AFPA 20′ embodiment of FIG. 6 provides a low-driving impedance for the negative modulation excursions applied as an input to the AFPA 20′ with the PNP transistor 34 admirably fulfilling this function in a relatively simple direct manner and with relatively low power being dissipated through the transistor 34.

The AFPA 20'' embodiment of FIG. 7 illustrates that the amplifier need not be divided into just two amplifier segments and that, therefore, the total output signal excursion need not be divided into just two segments. In fact, even higher efficiency results are obtainable with more than two amplifier segments being used. The circuit requirements for accomplishing this include additional amplifying devices such as NPN transistors 29*n* and 29*n*–1 and with bias source steps as represented by batteries 28*n* and 28*n*–1. Further, power supply increments are required as indicated by the power supply batteries 23*n* and 23*n*–1 with the dotted lines respectively indicating possible inclusion of additional bias step batteries, additional NPN transistor amplifying devices with their connections, and additional power supply batteries, one each respectively, for each amplifying segment. This is with, advantageously, each amplifier section device and power supply being smaller capacity elements since the operational service demands are less than where fewer amplifier segments are used. Please note the decoupling diodes 36 through 36*n* that have been added with connections such as, respectively, the cathode of diode 36 to the collector of NPN transistor 27 and anode to the positive terminal of power supply battery 22, and through to diode 36*n* connected cathode to the collector of NPN transistor 29*n*–1 and anode to the common junction of the negative terminal of battery 23*n* and the positive terminal of power supply battery 23*n*–1. Efficiency is increased with this embodiment since the voltage across each amplifier element, during the time it is conducting, is smaller with the increased number of such elements. With this multisegment embodiment with more than two segments, just as with the two-segment embodiments, only one amplifying device or amplifying segment conducts at any one time except at the points of crossover.

Referring to FIG. 8, schematic details are given for an AFPA 20''' designed for a 30-watt transistorized transmitter with very good performance results even though it may not be the most optimum design. In this embodiment modulating signal source 10 is connected for supplying a modulating signal input to the preamplifier and driver circuit 37 having two outputs with one connected to the cathode of diode 38. The anode of diode 38 is connected to the base of NPN transistor 27A and also to the junction of resistors 39 and 40 serially connected between the positive terminal of power supply 23 and ground. The emitter of NPN transistor 27A is connected to the base of NPN transistor 27B having an emitter connection both to the modulating signal output line and also through a negative feedback signal line extending back to the preamplifier and driver circuit 37. The collectors of NPN transistors 27A and 27B are connected in common to the cathode of diode 41 and through the diode 41 to the common junction of power supply batteries 22 and 23. The other output of preamplifier and driver circuit 37 is connected to the base of NPN transistor 29A having an emitter connection to the base of NPN transistor 29B. The emitter of NPN transistor 29B is connected to the modulating signal output line and also to the negative feedback line in common with the emitter of NPN transistor 27B in the negative feedback connection back to the preamplifier and driver circuit 37. The collectors of both NPN transistors 29A and 29B are connected in common to the positive terminal of power supply battery 23 also connected as a power supply to the preamplifier and driver circuit 37. Please note in this embodiment that transistors 27A and 27B function much the same as NPN transistor 27 in the embodiment of FIG. 5 and that transistors 29A and 29B function much the same as transistor 29 of FIG. 5. Diode 38 acts to decouple the base of transistor 27A in preventing excess loading on the driver during positive modulation excursions, and diode 41 decouples transistors 27A and 27B from the power supplies during positive modulation excursions to prevent reverse conduction through these transistors. Resistors 39 and 40 set the voltage at which crossover occurs from the amplifier segment of transistor 27A to the amplifier segment of transistor 29A. The relative bias between the two amplifier segments in this embodiment instead of being supplied by a battery 28, as in the FIG. 5 embodiment, is determined by the preamplifier and driver circuit 37 with which the negative feedback results in increased linearity and bandwidth. The negative feedback also, with the preamplifier and driver circuit in the AFPA, provides a stable low output impedance, and stabilizes, filters, and regulates the power supplied to the RFPA 16 direct connected to receive the output modulating signal from AFPA 20'''. This particular embodiment has provided low distortion operation, 100 percent modulation through the 0 to 50 kHz. range with no discernible amplitude deviation, although, some distortion appears on negative excursions about 50 kHz. at 100 percent modulation due to transistor limitations and inadequate driving source impedance. It should be noted further, however, that at 25 percent modulation the output has low distortion and is substantially uniform up to at least 500 kHz.

Modification of the AFPA 20''' of FIG. 8 may be provided as schematically illustrated in FIG. 9 when the requirement for a second higher level power supply, or converter, to supply the upward modulation power is, as would often be the case, inconvenient, especially, for example, in the instance where a transmitter is being converted from a class B transformer coupled AM modulator to one of the AM modulator systems presented herein. A further inconvenience, particularly at higher power levels, is a requirement for a power supply to be a floating power supply with none of its terminals at ground potential. These disadvantages are, in large measure, overcome with the circuit modification of FIG. 9 in developing a voltage approximately equal to twice the voltage supplied to the circuit in essentially a voltage doubling operation. The circuit changes include replacement of the power supply battery 23 of FIG. 8 with circuit components including threshold detector circuit 42 connected to receive as an input the signal, as waveform indicated, on the AFPA 20''' modulating signal output line for developing from the modulation output signal a substantially square wave output signal, also indicated in FIG. 9. This threshold detector circuit 42 output is fed to the cathode of diode 43 and the common junction of resistors 44 and 45. Resistor 44 is connected at its other end to the base of PNP transistor 46 having a collector connection to ground and an emitter connection in common with the emitter of NPN transistor 47 through a relatively large capacitor 48 to a higher voltage line connected back to the collectors of NPN transistors 29A and 29B and also as a voltage input power supply to preamplifier and driver circuit 37 just as with battery 23 in FIG. 8. The anode of diode 43 is connected to the common junction of resistors 45 and 49 and to the base of NPN transistor 47. The other end of resistor 49 and the collector of NPN transistor 47 are connected to the positive terminal of power supply battery 22 and also to the anode of diode 50 and through the diode 50 to the higher voltage line side of capacitor 48 connected to the collectors of NPN transistors 29A and 29B.

With operation of a portion of the FIG. 9 configuration as a voltage doubler in an AFPA when the modulation output signal goes downward, the threshold detector circuit 42, with the threshold set to the zero modulation level, provides a maximum negative output applied through to the bases of PNP transistor 46 and NPN transistor 47 to result in switch "on" of PNP transistor 46 and switch "off" of NPN transistor 47. The relatively large storage capacitor 48 is, as a result, charged to essentially the voltage of the positive terminal of power supply battery 22 through diode 50 and transistor 46, and with resistor 44 fulfilling the function of limiting charging current to a safe value. Then when the modulation output returns through the preset threshold of threshold detector circuit 42 and goes upward, the threshold detector switches transistor 46 "off" and transistor 47 "on." This results in capacitor 48 being now in series with the positive terminal of voltage power supply 22 to result in a voltage level at the high voltage side of capacitor 48 being boosted to substantially twice the voltage value of the positive terminal of voltage power supply 22. In this operational state the path of current flow is from the positive terminal of voltage power supply 22 through NPN transistor 47 and the capacitor 48 to the collectors of transistors 29A and 29B. Diode 43 is useful in preventing overdrive of NPN transistor 47 on positive signal excursions and resistors 45 and 49 provide for proper level saturation current through the base of NPN transistor 47.

Please note that in an AM modulation system utilizing an AFPA with a voltage doubling action that, particularly when occasional upward signal peak clipping can be tolerated, a clipping action caused by an insufficient charge on the capacitor 48, the circuit can be simplified through omission of the threshold detector circuit 42 and having a direct connection from the AFPA modulation output line to the common junction of diode 43 and resistors 44 and 45 of FIG. 9. With this modification the unprocessed modulation output signal then drives transistors 46 and 47 in their operational switch "on" and switch "off" action. It is of interest to note further, that, with such embodiments as shown by FIG. 9, if it is required that there be no clipping or that this factor be minimized even after long periods without modulation through which time capacitor 48 may become discharged to some extent, a "keep alive" pulse can be supplied to the circuit periodically through such intervals of time when modulation may be absent to keep the capacitor 48 fully charged.

Thus, there are hereby provided improved audio frequency power amplifier circuits that are particularly useful in high-level amplitude modulation systems and that make possible high efficiency transformerless amplitude modulator systems providing many advantages over various AM modulating systems of the art. As compared to the conventional class B transformer coupled AM system, these new AM systems advantageously do not require a transformer and have great size, weight and cost savings. Further advantages are greatly extended frequency and phase response, elimination of losses such as transformer losses, reduction of destructive transients, and much less interaction between the RFPA and the modulator power amplifier circuit. Further, various of these circuits include feedback features since the new AM modulator systems readily provide for obtaining high linearity and control modulator MODULATOR output impedance by feedback control. Furthermore, relatively crude and inexpensive power supplies may be employed. With reference to class A series modulators of the art various other advantages become apparent. Among these advantages are that zero level modulation losses are very small resulting in much less elaborate cooling provisions, and the total power supply requirements are less. The new AM modulator systems require fewer and/or smaller active elements and, in some of the embodiments, a single power supply with half the voltage requirements for a class A series modulator may be used.

Whereas this invention is herein illustrated and described with respect to specific embodiments thereof, it should be realized that various changes may be made without departing from the essential contributions to the art made by the teachings hereof.

I claim:

1. An audio frequency power amplifier having: signal input connective means; a plurality of amplifier segments connected in parallel to said input connective means; at least one amplifier device in each segment; voltage power supply means with a different voltage level connection in the same direction from a voltage potential reference source for each of said amplifier segments; bias source step means between adjacent amplifier segments; with a signal output connection from each of said amplifier segments in common to a signal output line connection; and wherein the bias source step means between adjacent amplifier segments is provided in the connection and in the input signal path, respectively, of each of the plurality of said amplifier segments, more than one, to said input connective means.

2. The audio frequency power amplifier of claim 1, wherein with a plurality of more than two amplifier segments the bias source step means for successive amplifier segments are series connected with the common junctions between successive bias source step means being input connections for respective amplifier segments.

3. The audio frequency power amplifier of claim 2, wherein the bias source step means are batteries with at least one in each input connection between parallel-connected adjacent amplifier segments.

4. The audio frequency power amplifier of claim 2, including unidirectional conductive means in the connection between at least one of said amplifier segments and the respective power supply voltage level connection for the respective segment.

5. The audio frequency power amplifier of claim 4, wherein said unidirectional conductive means is at least one diode.

6. The audio frequency power amplifier of claim 1, wherein there are two amplifier segments with the voltage level connection from said voltage power supply means for one of said amplifier segments being at substantially a voltage level twice the voltage level of the connection from said voltage power supply means for the other of said amplifier segments.

7. The audio frequency power amplifier of claim 1, wherein said voltage power supply means includes a plurality of series-connected batteries connected in voltage adding direction from a voltage potential reference source; and with junctions between batteries and the battery terminal most remote from said voltage potential reference source being said different voltage level connections of said voltage power supply means for the respective amplifier segments.